(12) United States Patent
Kim

(10) Patent No.: US 11,679,566 B2
(45) Date of Patent: Jun. 20, 2023

(54) DEVICE AND METHOD FOR BONDING FUEL CELL PART

(71) Applicants: HYUNDAI MOTOR COMPANY, Seoul (KR); KIA CORPORATION, Seoul (KR)

(72) Inventor: Min Pyo Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 73 days.

(21) Appl. No.: 17/528,707

(22) Filed: Nov. 17, 2021

(65) Prior Publication Data

US 2022/0072804 A1 Mar. 10, 2022

Related U.S. Application Data

(62) Division of application No. 16/665,588, filed on Oct. 28, 2019, now Pat. No. 11,207,846.

(30) Foreign Application Priority Data

Apr. 16, 2019 (KR) ........................ 10-2019-0044384

(51) Int. Cl.
*H01M 8/10* (2016.01)
*B29C 65/64* (2006.01)
(Continued)

(52) U.S. Cl.
CPC ........ *B29C 65/645* (2013.01); *B29C 65/4825* (2013.01); *B29C 65/7847* (2013.01);
(Continued)

(58) Field of Classification Search
CPC ............. H01M 4/8807; H01M 4/8803; H01M 4/8814; H01M 4/881; H01M 8/1226;
(Continued)

(56) References Cited

U.S. PATENT DOCUMENTS 6,158,645 A 12/2000 Sakamoto et al.
8,256,661 B2 9/2012 VanDyke et al.
(Continued)

FOREIGN PATENT DOCUMENTS

KR 1020180068793 A 6/2018

*Primary Examiner* — Raymond Alejandro
(74) *Attorney, Agent, or Firm* — McDonnell Boehnen Hulbert & Berghoff LLP

(57) ABSTRACT

A bonding device of a fuel cell part is disclosed. The bonding device of the fuel cell part may bond an upper gas diffusion layer and a lower gas diffusion layer to top and bottom surfaces of an MEA base material through adhesive layers, while disposing the MEA base material between the upper gas diffusion layer and the lower gas diffusion layer, and may include: a lower die that supports the MEA base material, the upper gas diffusion layer, and the lower gas diffusion layer to be bonded with each other; an upper die installed in an upper side of the lower die; and an ultrasonic wave vibration source that is installed to be capable of moving in a vertical direction at opposite sides of the upper die, compressing the upper gas diffusion layer, and applying ultrasonic wave vibration energy to the adhesive layer.

5 Claims, 20 Drawing Sheets

(51) Int. Cl.
   *H01M 8/1226*   (2016.01)
   *B29C 65/78*    (2006.01)
   *B29C 65/48*    (2006.01)
   *H01M 4/88*     (2006.01)
   *B29L 31/34*    (2006.01)

(52) U.S. Cl.
   CPC ....... *H01M 4/8807* (2013.01); *H01M 8/1226* (2013.01); *B29L 2031/3468* (2013.01)

(58) Field of Classification Search
   CPC ... H01M 8/1213; H01M 8/124; B29C 65/645; B29C 65/4825; B29C 65/7847; B29L 2031/3468
   See application file for complete search history.

(56) References Cited

U.S. PATENT DOCUMENTS

| | | | |
|---|---|---|---|
| 2003/0091885 A1* | 5/2003 | Kobayashi | H01M 8/0263 29/623.2 |
| 2008/0057380 A1 | 3/2008 | Dabel et al. | |
| 2008/0142152 A1* | 6/2008 | Debe | H01M 8/2457 156/247 |
| 2013/0216932 A1* | 8/2013 | Yandrasits | H01M 8/0267 429/481 |

\* cited by examiner

DEVICE AND METHOD FOR BONDING FUEL CELL PART

CROSS REFERENCE TO RELATED APPLICATIONS

The present application is a divisional of U.S. patent application Ser. No. 16/665,588, filed Oct. 28, 2019, which claims priority to and the benefit of Korean Patent Application No. 10-2019-0044384, filed on Apr. 16, 2019. The entire disclosure contents of these applications are herewith incorporated by reference into the present application.

FIELD

The present disclosure relates to a fuel cell part manufacturing system. More particularly, it relates to a bonding device of a fuel cell part, which bonds a gas diffusion layer (GDL) to opposite sides of a membrane-electrode assembly (MEA), and a method thereof.

BACKGROUND

The statements in this section merely provide background information related to the present disclosure and may not constitute prior art.

A fuel cell generates electricity by an electrochemical reaction between hydrogen and oxygen. The fuel cell can continuously generate electricity by receiving a chemical reactant from the outside without an additional charging process.

The fuel cell may be formed by disposing a separator (or a bipolar plate) at opposite sides of a membrane-electrode assembly (MEA). Such a fuel cell may be provided in plural and be continuously arranged, and may be formed by a fuel cell stack.

According to one form, a membrane-electrode assembly, which is a main part of the fuel cell, forms an anode electrode layer (catalyst layer) in one side thereof and forms a cathode electrode layer (catalyst layer) in the other side thereof. In addition, each of the opposite sides of the MEA is provided with a gas diffusion layer (GDL) that diffuses a reaction gas of hydrogen and oxygen to the anode electrode layer and the cathode electrode layer.

A fuel cell part including such a membrane-electrode assembly and a gas diffusion layer can be manufactured by integrally bonding a gas diffusion layer to opposite surfaces of a membrane-electrode assembly (hereinafter referred to as an MEA base material).

As a method of bonding the gas diffusion layer to the MEA base material, for example, a hot press method in which the gas diffusion layer applied with an adhesive on the edge is disposed on both sides of the MEA base material, and the adhesive is heated while compressing the MEA base material and the gas diffusion layer with high temperature and high pressure such that the MEA base material and the gas diffusion layer are integrally bonded to each other, is adopted.

However, in a conventional art, since the edge portion of the gas diffusion layer, corresponding to a portion where the adhesive is applied, is compressed with a high pressure (e.g., 1300 kgf), plastic deformation or damage to an external material (carbonized paper) of the gas diffusion layer can be caused, and accordingly, bonding quality of the gas diffusion layer may be deteriorated.

In addition, in the conventional art, heat at a high temperature (for example, 95° C.) is applied directly to the edge of the gas diffusion layer, the heat is transferred to the adhesive, and the MEA base material and the gas diffusion layer are bonded such that bonding cycle time (for example, 15 seconds) between the MEA base material and the gas diffusion layer may increase.

In the conventional art, direct application of high temperature heat to the edge of the gas diffusion layer can cause thermal deformation of the electrolyte membrane of the MEA base material due to heat applied to the MEA base material.

Furthermore, in the conventional art, consumption of the adhesive may be increased by bonding the MEA base material and the gas diffusion layer to the edge of the gas diffusion layer at high temperature and high pressure.

The above information disclosed in this Background section is only for enhancement of understanding of the background of the present disclosure, and therefore it may contain information that does not form the prior art that is already known to a person of ordinary skill in the art.

SUMMARY

The present disclosure provides a bonding device of a fuel cell part and a method thereof to bond an MEA base material and a gas diffusion layer by ultrasonic wave vibration welding, and improve quality of bonding between the MEA base material and the gas diffusion layer, and productivity.

A bonding device of a fuel cell part according to one form of the present disclosure bonds an upper gas diffusion layer and a lower gas diffusion layer to upper and lower surfaces of an MEA base material through an adhesive layer, while disposing the MEA base material between the upper gas diffusion layer and the lower gas diffusion layer, and includes: a lower die that supports the MEA base material, the upper gas diffusion layer, and the lower gas diffusion layer to be bonded with each other; an upper die installed in an upper side of the lower die; and an ultrasonic wave vibration source that is installed to be capable of moving in a vertical direction at opposite sides of the upper die, compressing the upper gas diffusion layer, and applying ultrasonic wave vibration energy to the adhesive layer.

In addition, in the bonding device of the fuel cell part according to one form of the present disclosure, the ultrasonic wave vibration source may apply ultrasonic wave vibration energy to a plurality of adhesive layers, each applied in the form of a spot, to edge portions of the upper gas diffusion layer and the lower gas diffusion layer, which face sub-gaskets of the MEA base material.

In addition, in the bonding device of the fuel cell part according to one form of the present disclosure, the adhesive layer may be applied in the form of a spot to the edge portions of the upper gas diffusion layer and the lower gas diffusion layer, which face each other at opposite sides of the MEA base material.

In addition, in the bonding device of the fuel cell part according to one form of the present disclosure, the ultrasonic wave vibration source may compress a local region of the upper gas diffusion layer, which corresponds to the adhesive layer.

In addition, a bonding device of a fuel cell part according to one form of the present disclosure is provided with an MEA base material that forms electrode layers at opposite sides of an electrolyte membrane and covers edge portions of the electrolyte membrane and the electrode layers through sub-gaskets, and an upper gas diffusion layer and a lower gas diffusion layer where adhesive layers are applied in the form of spots to edge portions that face the sub-gaskets at opposite sides of the MEA base material, and bonds the upper gas diffusion layer and the lower gas diffusion layer to upper and lower surfaces of the MEA base material through the adhesive layers, and includes: i) a lower die where vacuum suction holes are formed on an upper surface thereof; ii) an upper die provided in an upper side of the lower die; iii) a vacuum adsorption member where vacuum suction holes are formed on a lower surface thereof, and provided to be vertically movable in the upper die; and iv) an ultrasonic wave vibration source that is vertically movable in opposite sides of the upper die, while disposing the vacuum adsorption member therebetween, and applies ultrasonic wave vibration energy to the adhesive layer while compressing a local region set in the upper gas diffusion layer, while disposing the MEA base material between the upper gas diffusion layer and the lower gas diffusion layer on the lower die.

In addition, the bonding device of the fuel cell part according to one form of the present disclosure may further include v) an air damping unit that is provided at opposite sides of the lower die, dampens a compression force of the ultrasonic wave vibration source, and applies the compression force and a damping force to the ultrasonic wave vibration source side as an air pressure that reacts with the ultrasonic wave vibration energy.

In addition, in the bonding device of the fuel cell part according to one form of the present disclosure, the vacuum adsorption member may vacuum-adsorb the upper gas diffusion layer through the vacuum suction holes.

In addition, in the bonding device of the fuel cell part according to one form of the present disclosure, the lower die may vacuum-adsorb the upper gas diffusion layer and the lower gas diffusion layer through the vacuum suction holes.

In addition, in the bonding device of the fuel cell part according to one form of the present disclosure, the lower die may partition a GDL adsorption area where the upper gas diffusion layer and the lower gas diffusion layer are vacuum-sucked through the vacuum suction holes, and an MEA adsorption area where an edge portion of the MEA base material is vacuum-sucked.

In addition, in the bonding device of the fuel cell part according to one form of the present disclosure, the vacuum adsorption member may form the vacuum suction holes at a lower surface thereof, and may be provided to be vertically movable by a driving source that is provided in the upper die and includes an actuating cylinder.

In addition, in the bonding device of the fuel cell part according to one form of the present disclosure, the upper gas diffusion layer and the lower gas diffusion layer may be applied with the adhesive layers at edge portions, which face each other at opposite sides of the MEA base material.

In addition, in the bonding device of the fuel cell part according to one form of the present disclosure, the ultrasonic wave vibration source may compress a local region of the upper gas diffusion layer, which corresponds to the adhesive layer.

In addition, in the bonding device of the fuel cell part according to one form of the present disclosure, the ultrasonic wave vibration source may include: a moving member that is provided to be vertically movable through a driving source that includes an actuating cylinder at opposite sides of the upper die; a converter that is provided in the moving member and converts an electrical signal to mechanical vibration energy; a booster that is connected with the converter and amplifies and attenuates mechanical vibration energy; and a horn member that is connected with the booster and compresses a local region of the upper gas diffusion layer that corresponds to the adhesive layer.

In addition, in the bonding device of the fuel cell part according to one form of the present disclosure, the horn member may include a pair of compression ends that compress a local region of the upper gas diffusion layer that corresponds to the adhesive layer.

In addition, in the bonding device of the fuel cell part according to one form of the present disclosure, the compression end may be formed to protrude in a downward direction while having a predetermined width, and a corner portion of the compression end, which compresses the local region of the upper gas diffusion layer, may be rounded.

In addition, in the bonding device of the fuel cell part according to one form of the present disclosure, the air damping unit may be provided as a pair at opposite sides of the lower die corresponding to the local region of the upper gas diffusion layer.

In addition, in the bonding device of the fuel cell part according to one form of the present disclosure, the air damping unit may include: an air chamber provided in the lower die with an open upper end; a damping plate that closes the upper end of the air chamber and is provided to be vertically movable; and an air supply that is connected with the air chamber and supplies air at a predetermined pressure to the air chamber.

In addition, in the bonding device of the fuel cell part according to one form of the present disclosure, the air damping unit may further include a displacement sensor that is provided in the air chamber, senses vertical displacement of the damping plate, and outputs a detection signal to a controller.

In addition, a method for bonding a fuel cell part according to one form of the present disclosure provides: an MEA base material that forms electrode layers on opposite sides of an electrolyte membrane and covers edge portions of the electrolyte membrane and the electrode layers through sub-gaskets, and an upper gas diffusion layer and a lower gas diffusion layer, each applied with an adhesive layer in the form of a spot at edge portions that face the sub-gaskets at opposite sides of the MEA base material, and bonds the upper gas diffusion layer and the lower gas diffusion layer to upper and lower surfaces of the MEA base material through the adhesive layer by using the bonding device. The method includes: (a) loading the upper gas diffusion layer on a predetermined area of a lower die, and vacuum-adsorbing the upper gas diffusion layer; (b) lowering a vacuum adsorption member of an upper die, vacuum-adsorbing the upper gas diffusion layer through the vacuum adsorption member, and raising the vacuum adsorption member; (c) loading the lower gas diffusion layer on a predetermined area of the lower die, vacuum-adsorbing the lower gas diffusion layer, and loading the MEA base material on the lower gas diffusion layer; (d) lowering the vacuum adsorption member, and loading the upper gas diffusion layer on the MEA base material; and (e) moving an ultrasonic wave vibration source in a downward direction, compressing the predetermined local regions set at opposite sides of the upper gas diffusion layer through a horn member of the ultrasonic wave vibration source, and applying ultrasonic wave vibration energy to the adhesive layer through the horn member.

In addition, in the method for bonding the fuel cell part according to one form of the present disclosure, in (e), a compression force of the horn member may be dampened through an air damping unit of the lower die, and a damping force may be applied to the horn member through a damping plate as air compression that reacts with ultrasonic wave vibration energy.

In addition, in the method for bonding the fuel cell part according to one form of the present disclosure, in (e), displacement of the damping plate that vertically moves in an air chamber of the air damping unit may be sensed, and a detection signal may be output to a controller.

In addition, in the method for bonding the fuel cell part according to one form of the present disclosure, in (e), the controller may control pressure of air supplied to the air chamber according to the detection signal of the displacement sensor.

In addition, in the method for bonding the fuel cell part according to one form of the present disclosure, in (a), vacuum suction may be applied to vacuum suction holes of the lower die.

In addition, in the method for bonding the fuel cell part according to one form of the present disclosure, in (b), vacuum-adsorption pressure with respect to the vacuum suction holes of the lower die may be blocked.

In addition, in the method for bonding the fuel cell part according to one form of the present disclosure, in (c), vacuum-adsorption pressure may be applied to the vacuum suction holes of the lower die, and the lower gas diffusion layer and the MEA base material may be vacuum-sucked.

In addition, in the method for bonding the fuel cell part according to one form of the present disclosure, in (d), vacuum-adsorption pressure may be applied to vacuum suction holes of the vacuum adsorption member.

In addition, in the method for bonding the fuel cell part according to one form of the present disclosure, in (e), vacuum-adsorption pressure with respect to the vacuum suction holes of the vacuum adsorption member may be blocked, and vacuum-suction with respect to the vacuum suction holes of the lower die may be blocked.

According to one forms of the present disclosure, the bonding time between the MEA base material and the gas diffusion layer can be shortened by bonding the MEA base material and the gas diffusion layer using ultrasonic wave vibration welding, and deformation and damage of the gas diffusion layer can be reduced.

In addition, other effects which may be obtained or expected by one forms of the present disclosure will be directly or implicitly disclosed in the detailed description of the forms of the present disclosure. That is, various effects expected according to one forms of the present disclosure will be disclosed in the detailed description below.

Further areas of applicability will become apparent from the description provided herein. It should be understood that the description and specific examples are intended for purposes of illustration only and are not intended to limit the scope of the present disclosure.

BRIEF DESCRIPTION OF THE FIGURES

In order that the disclosure may be well understood, there will now be described various forms thereof, given by way of example, reference being made to the accompanying drawings, in which.

Figure 1:
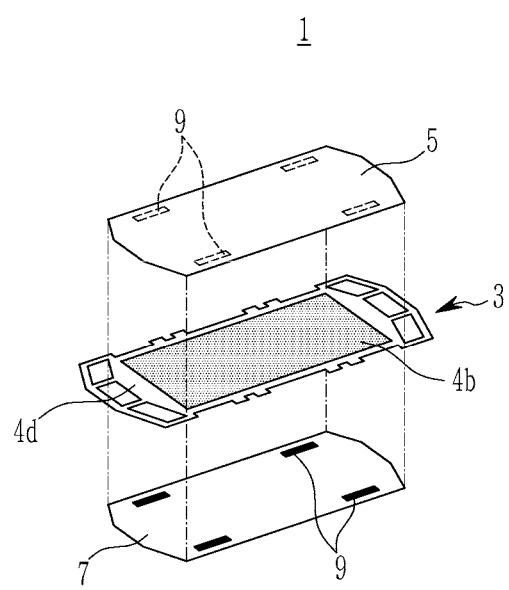
FIG. 1 and FIG. 2 schematically illustrate one fuel cell part applied to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the disclosure are shown. As those skilled in the art would realize, the described forms may be modified in various different ways, all without departing from the spirit or scope of the present disclosure.

The drawings and description are to be regarded as illustrative in nature and not restrictive. Like reference numerals designate like elements throughout the specification.

Further, since size and thickness of each component illustrated in the drawings are arbitrarily represented for convenience in explanation, the present disclosure is not particularly limited to the illustrated size and thickness of each component, and the thickness is enlarged and illustrated in order to clearly express various parts and areas.

In the following description, dividing names of components into first, second, and the like is to divide the names because the names of the components are the same, and an order thereof is not particularly limited.

In addition, unless explicitly described to the contrary, the word "comprise" and variations such as "comprises" or "comprising" will be understood to imply the inclusion of stated elements but not the exclusion of any other elements.

Further, terms such as " . . . unit", " . . . means", " . . . unit", and " . . . member" described in the specification mean a unit of a collective configuration to perform at least one function or operation.

Figure 2:
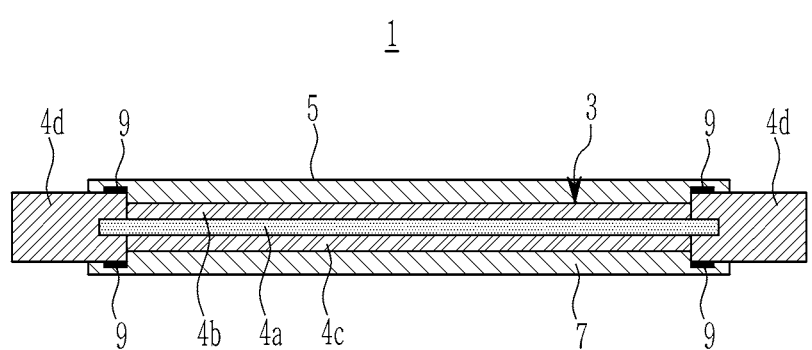
Figure 3:
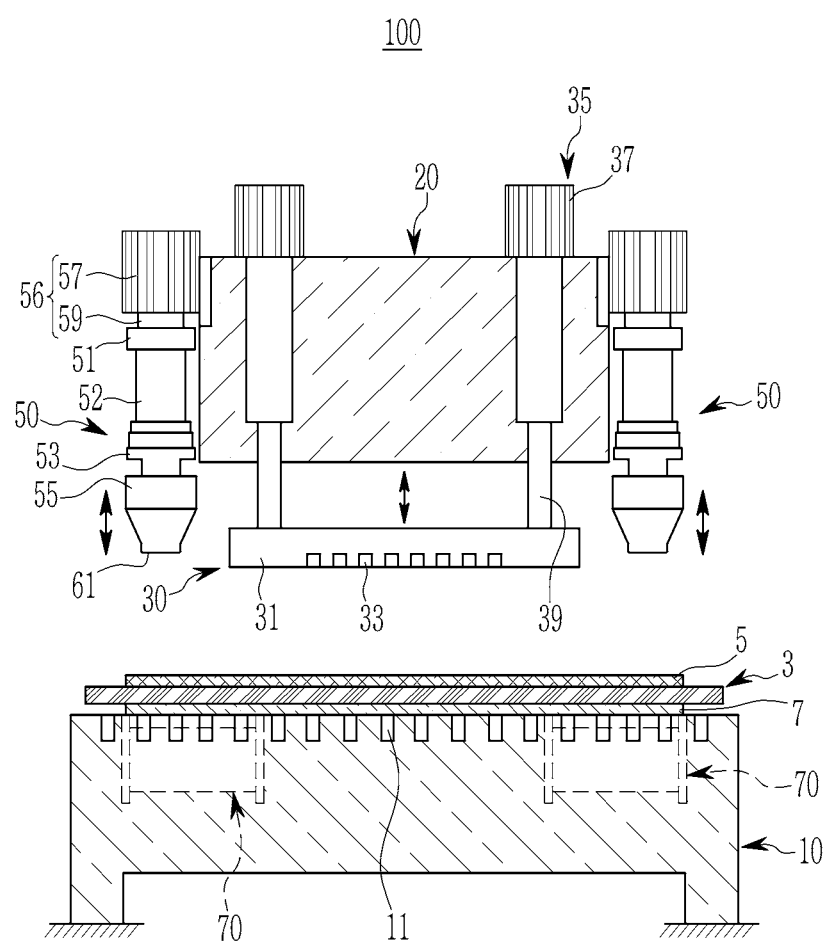
FIG. 3 schematically shows a bonding device of the fuel cell part according to one form of the present disclosure.

FIG. 1 and FIG. 2 schematically illustrate a fuel cell part as an example applied to one form of the present disclosure, and FIG. 3 schematically illustrates a bonding device of a fuel cell part according to one form of the present disclosure.

Referring to FIG. 1 to FIG. 3, a bonding device 100 of a fuel cell part according to one form of the present disclosure may be applied to a system that automatically and continuously manufactures parts of unit fuel cells that form a fuel cell stack.

For example, as a main part of a fuel cell, a fuel cell part 1 applied to one form of the present disclosure may be defined as a part to which gas diffusion layers (GDL) 5 and 7 are respectively bonded to opposite sides (top and bottom sides in the drawing) of a membrane-electrode assembly (MEA) 3 (hereinafter, referred to as a MEA base material).

Hereinafter, referring to the drawings, the gas diffusion layer 5 bonded to the top side of the MEA base material 3 will be referred to as an upper gas diffusion layer, and the gas diffusion layer 7 bonded to the bottom side of the MEA base material 3 will be referred to as a lower gas diffusion layer.

The MEA base material 3 forms an anode electrode layer 4b in one side (a top side in the drawing) of an electrolyte membrane 4a, and forms a cathode electrode layer 4c in another side (a bottom side in the drawing) of the electrolyte membrane 4a.

In addition, the MEA base material 3 further includes a sub-gasket 4d that protects the electrode layers 4b and 4c and the electrolyte membrane 4a, and assures assemblability of the fuel cell. The sub-gasket 4d may be formed of, for example, polyester polymers.

Such a sub-gasket 4d covers edge portions of the electrolyte membrane 4a and the electrode layers 4b and 4c, and forms top and bottom open ends that open the electrode layers 4b and 4c. The sub-gasket 4d is bonded to the edge portions of the electrode layers 4b and 4c through the end portions of the top and bottom open ends, and is bonded to the edge portion of the electrolyte membrane 4a while extending to the outside.

Here, the above-stated upper gas diffusion layer 5 functions to diffuse hydrogen gas to the anode electrode layer 4b of the MEA base material 3 while having electrical conductivity. In addition, the lower gas diffusion layer 7 functions to diffuse air to the cathode electrode layer 4c of the MEA base material 3 while having electrical conductivity. For example, the upper gas diffusion layer 5 and the lower gas diffusion layer 7 may have a structure in which carbonized paper is bonded to a top side of a microporous layer (MPL).

The upper gas diffusion layer 5 and the lower gas diffusion layer 7 may be respectively bonded to the top side and the bottom side of the MEA base material 3 by the bonding device 100 of the fuel cell part according to one form of the present disclosure, disposing the MEA base material 3 therebetween.

Further, the upper gas diffusion layer 5 and the lower gas diffusion layer 7 may be bonded to the edge portions of the top and bottom open ends of the sub-gasket 4d in the MEA base material 3 by the bonding device 100 of the fuel cell part according to one form of the present disclosure. That is, the upper gas diffusion layer 5 and the lower gas diffusion layer 7 may be bonded to the edge portions of the top and bottom open ends of the sub-gaskets 4d, which face the upper gas diffusion layer 5 and the lower gas diffusion layer 7.

Further, adhesive layers 9 are formed in the edge portions of the upper gas diffusion layer 5 and the lower gas diffusion layer 7, which face the sub-gaskets 4d at opposite sides of the MEA base material 3, to bond the edge portions and the sub-gaskets 4d by means of adhesion.

The adhesive layer 9 is provided as a known adhesive that is capable of being softened and melted when heat is applied and cured when the applied heat is blocked. This adhesive layer 9 is applied in the form of spots on opposite edges of the upper gas diffusion layer 5 and the lower gas diffusion layer 7, which face each other, on opposite sides of the MEA base material 3 in one form of the present disclosure.

In this case, the spot form means that the adhesive layer 9 is not continuously applied to the upper gas diffusion layer 5 and the lower gas diffusion layer 7 at the opposite edge portions (edge portions in the horizontal direction in the drawing) in a line form but is applied to a given section (e.g., 5×20 mm).

Such an adhesive layer 9 can be applied as single spots on opposite edges of the upper gas diffusion layer 5 and the lower gas diffusion layer 7, which face each other, at opposite sides of the MEA base material 3 as in the drawing.

The bonding device 100 of the fuel cell part according to one form of the present disclosure bonds the upper gas diffusion layer 5 and the lower gas diffusion layer 7 to top and bottom sides of the MEA base material 3 through the adhesive layer 9, while disposing the MEA base material 3 between the upper gas diffusion layer 5 and the lower gas diffusion layer 7.

Further, the bonding device 100 of the fuel cell part according to one form of the present disclosure compresses the upper gas diffusion layer 5 and the lower gas diffusion layer 7, while disposing the MEA base material 3 therebetween, softens and melts the adhesive layer 9 by applying heat thereto, and bonds edge portions of the upper gas diffusion layer 5 and the lower gas diffusion layer 7 to edge portions of the top and bottom open ends of the sub-gaskets 4d through the adhesive layers 9.

Such a bonding device 100 of the fuel cell part according to one form of the present disclosure is formed with a structure that can shorten bonding time of the upper gas diffusion layer 5 and the lower gas diffusion layer 7 with respect to the MEA base material 3, and minimize deformation and damage of the upper gas diffusion layer 5 and the lower gas diffusion layer 7 due to the pressure.

For this, the bonding device 100 of the fuel cell part according to one form of the present disclosure includes a lower die 10, an upper die 20, a vacuum adsorption member 30, an ultrasonic wave vibration source 50, and an air damping unit 70.

In one form of the present disclosure, the lower die 10 is installed at the floor of a working area. Here, the lower die 10 may be equipped with various additional components such as various brackets, support blocks, plates, housings, covers, collars, rods, and the like. Such a lower die 10 supports the upper gas diffusion layer 5 and the lower gas diffusion layer 7, and the MEA base material 3 disposed therebetween to be bonded.

Figure 4:
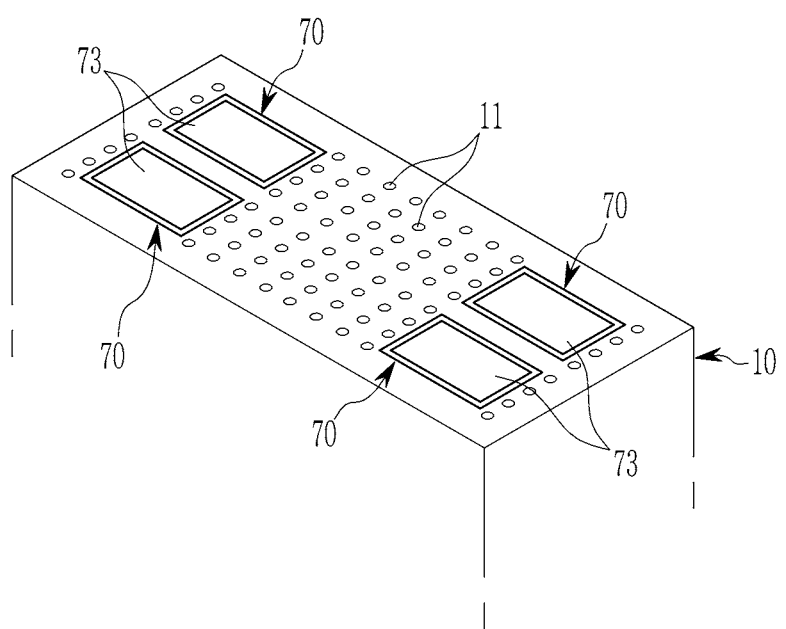
FIG. 4 is a perspective view of a lower die applied to the bonding device of the fuel cell part according to one form of the present disclosure.

FIG. 4 is a perspective view of a portion of the lower die applied to the bonding device of the fuel cell part according to one form of the present disclosure.

Referring to FIG. 1 to FIG. 4, the lower die 10 in one form of the present disclosure includes vacuum suction holes 11 formed on a top surface thereof for vacuum adsorption of the MEA base material 3, the upper gas diffusion layer 5, and the lower gas diffusion layer 7 by vacuum suction pressure.

The vacuum suction holes 11 may be applied with the vacuum suction by a vacuum pump (not illustrated), and the vacuum suction may be blocked by a general valve.

Figure 5:
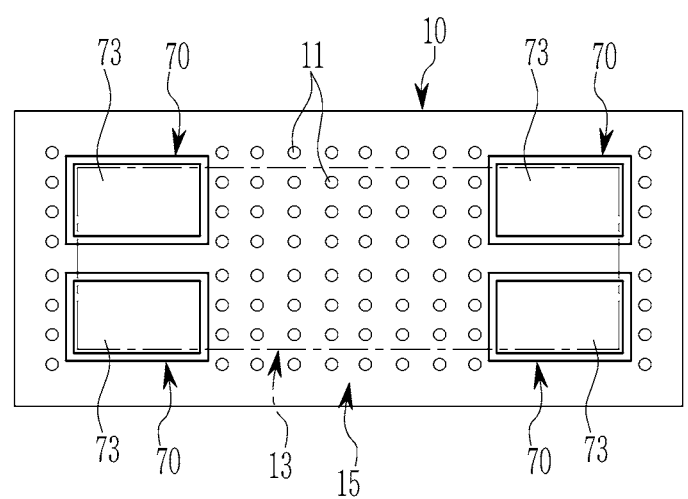
FIG. 5 is a plan schematic diagram of the lower die applied to the bonding device of the fuel cell part according to one form of the present disclosure.

The lower die 10 forms a lower mold plane. As shown in FIG. 5, the lower mole plane partitions a GDL adsorption area 13 where the upper gas diffusion layer 5 and the lower gas diffusion layer 7 are vacuum-sucked through the vacuum suction holes 11, and an MEA adsorption area 15 where edge sides of the sub-gaskets 4d of the MEA base material 3 are vacuum-sucked.

Referring to FIG. 1 to FIG. 3, the upper die 20 is provided in an upper side of the lower die 10 in one form of the present disclosure. Here, the upper die 20 may be equipped with various additional components such as various brackets, support blocks, plates, housings, covers, collars, rods, and the like. The upper die 20 is fixed to an upper side of the lower die 10 while having a predetermined gap therebetween.

Figure 6:
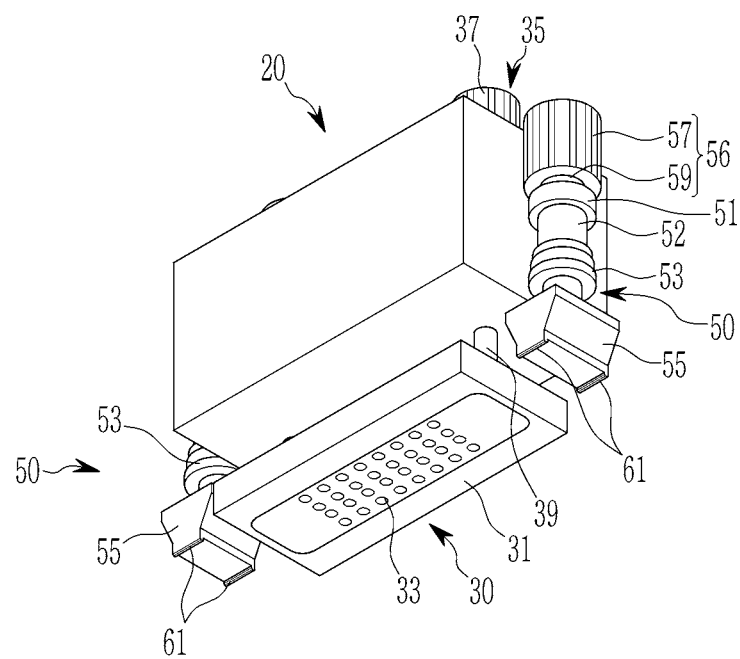
FIG. 6 is a perspective view of an upper die applied to the bonding device of the fuel cell part according to one form of the present disclosure.
Figure 7:
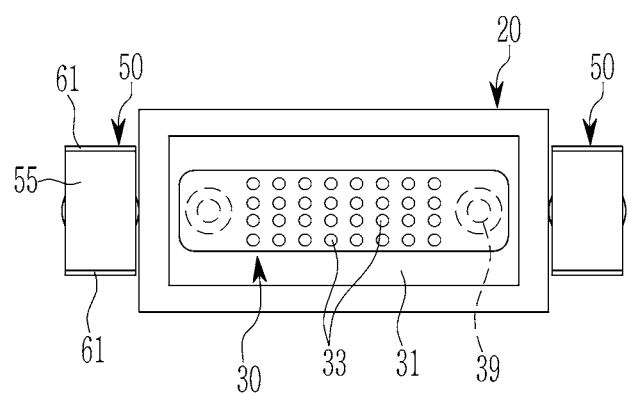
FIG. 7 is a plan schematic diagram of the lower die applied to the bonding device of the fuel cell part according to one form of the present disclosure.

FIG. 6 is a perspective view of the upper die applied to the bonding device of the fuel cell part according to one form of the present disclosure, and FIG. 7 is a top plan view of the upper die applied to the bonding device of the fuel cell part according to one form of the present disclosure.

Referring to FIG. 6 and FIG. 7, together with FIG. 3, in one form of the present disclosure, the vacuum adsorption member 30 vacuum-adsorbs the upper gas diffusion layer 5 loaded on the GDL adsorption area 13 (refer to FIG. 5) on the lower die 10.

The vacuum adsorption member 30 corresponds to the GDL adsorption area 13 of the lower die 10, and is installed to be movable back and forth between the two sides of the upper die 20 in the up and down directions. Such a vacuum adsorption member 30 includes an adsorption plate 31.

The adsorption plate 31 forms vacuum suction holes 33 for adsorption of the upper gas diffusion layer 5 with vacuum suction. A vacuum suction may be applied to the vacuum suction holes 33 by a vacuum pump (not illustrated), and the vacuum suction may be blocked by a general valve.

Such a vacuum adsorption member 30 is installed to be capable of reciprocating in a vertical direction by a first driving source 35 provided on the upper die 20. For example, the first driving source 35 includes a known actuating cylinder 37 operated by pneumatic or hydraulic pressure. An actuating rod 39 of the actuating cylinder 37 is connected with the vacuum adsorption member 30.

Referring to FIG. 1 to FIG. 3, in one form of the present disclosure, the ultrasonic wave vibration source 50 applies ultrasonic wave vibration energy to the adhesive layer 9 while compressing a predetermined local region of the upper gas diffusion layer 5, while disposing the MEA base material 3 between the upper gas diffusion layer 5 and the lower gas diffusion layer 7 on the lower die 10.

Further, the ultrasonic wave vibration source 50 may apply ultrasonic wave vibration energy to the adhesive layer 9 while compressing local regions of the upper gas diffusion layer 5, which respectively correspond to the adhesive layers 9.

The ultrasonic wave vibration source 50 is disposed at opposite sides of the upper die 20, and thus ultrasonic wave vibration sources 50 can be installed to be capable of reciprocating in a vertical direction at the opposite sides of the upper die 20. The ultrasonic wave vibration source 50 includes a moving member 51, a converter 52, a booster 53, and a horn member 55.

The moving member 51 is installed to be capable of reciprocating in a vertical direction through second driving sources 56 respectively provided at opposite sides of the upper die 20. For example, the second driving source 56 includes a known actuating cylinder 57 operated by pneumatic or hydraulic pressure. An actuating rod 59 of the actuating cylinder 57 is connected with the moving member 51.

The converter 52 (typically referred to as a vibrator in the art) converts an electrical signal to mechanical vibration energy, and is provided in the moving member 51. In addition, the booster 53 amplifies and attenuates mechanical vibration energy, and is connected with the converter 52.

Since the configuration of the converter 52 and the booster 53 is adopted in a known ultrasonic wave vibrating apparatus that is well known in the art, a detailed description of the configuration will be omitted in this specification.

Then, the horn member 55 substantially compresses the local region of the upper gas diffusion layer 5 corresponding to the adhesive layer 9 in the MEA material 3, the upper gas diffusion layer 5, and the lower gas diffusion layer 7, which are loaded on the lower die 10. In addition, the horn member 55 may apply mechanical vibration energy to each adhesive layer 9 through the local region of the upper gas diffusion layer 5.

Figure 8:
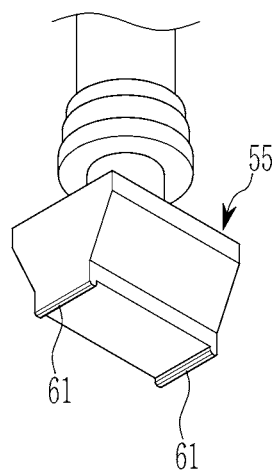
FIG. 8 is a perspective view of a horn member of an ultrasonic wave vibration source applied to the bonding device of the fuel cell part according to one form of the present disclosure.
Figure 9:
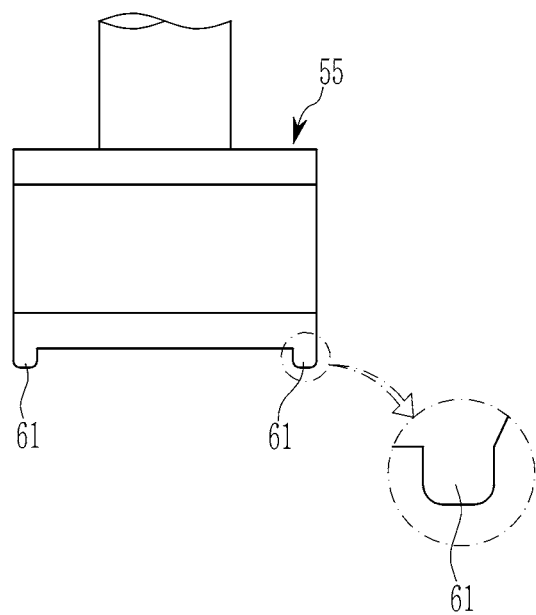
FIG. 9 is a front schematic diagram of a horn member of the ultrasonic wave vibration source applied to the bonding device of the fuel cell part according to one form of the present disclosure.

Since the horn member 55 is connected with the booster 53, as shown in FIG. 8 and FIG. 9, the horn member 55 includes a pair of compression ends 61 for pressing the local region of the upper gas diffusion layer 5 corresponding to the adhesive layer 9.

The compression ends 61 are provided in pairs on each horn member 55 corresponding to the opposite edge portions of the upper gas diffusion layer 5 and the lower gas diffusion layer 7 on both sides of the MEA base material 3.

The compression end 61 has a predetermined width and is formed to protrude downward along an edge direction of the upper gas diffusion layer 5. Here, at the compression end 61, a corner portion for pressing the local region of the upper gas diffusion layer 5 is provided with a round shape.

The edge of the compression end 61 is rounded in order to minimize material surface damage to the local region of the upper gas diffusion layer 5.

On the other hand, the compression end 61 of the horn member 55 compresses the local region of the upper gas diffusion layer 5 and applies the ultrasonic wave vibration energy to the adhesive layer 9 through the local region. Then, the adhesive layer 9 is softened and melted by applying heat by ultrasonic wave vibration energy, so that the edge portions of the upper gas diffusion layer 5 and the lower gas diffusion layer 7 can be bonded to the edge portions of the top and bottom open ends of the sub-gaskets 4d.

Referring to FIG. 1 to FIG. 4, in one form of the present disclosure, the air damping unit 70 dampens the compressive force of the ultrasonic wave vibration source 50, and applies the damping force as air pressure for reaction with the compression force and the ultrasonic wave vibration energy to the ultrasonic wave vibration source 50.

The air damping unit 70 is installed on both sides of the upper surface of the lower die 10 corresponding to the horn member 55 of the ultrasonic wave vibration source 50. Further, the air damping unit 70 is provided in pairs on each side of the lower die 10 corresponding to the local region of the upper gas diffusion layer 5.

Figure 10:
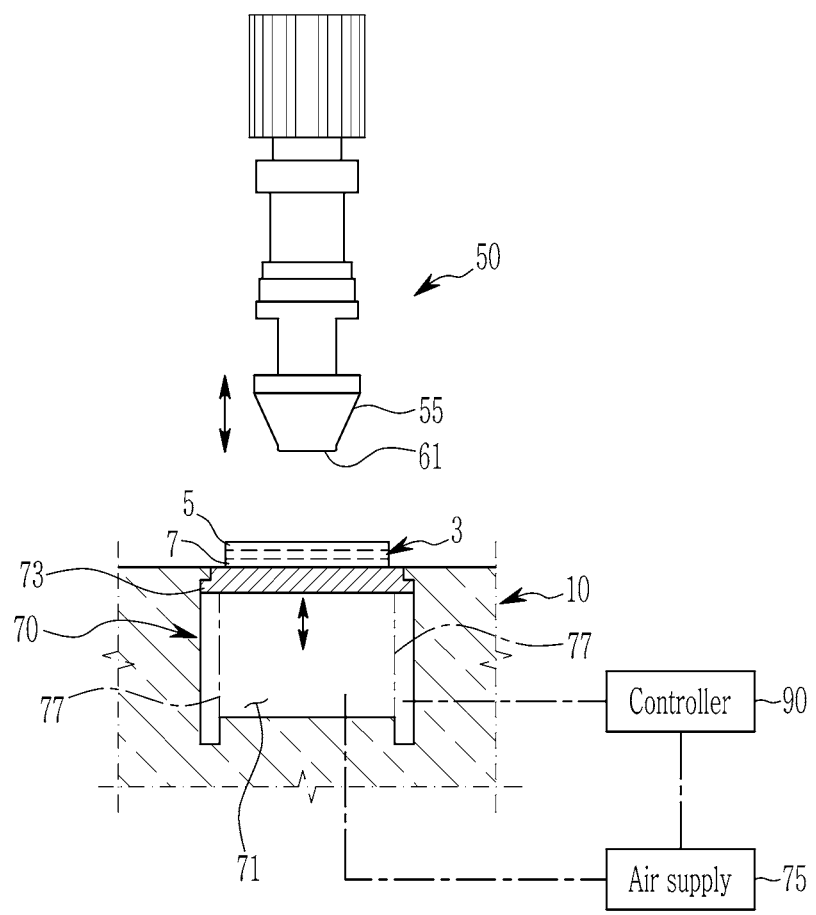
FIG. 10 shows an air damping unit applied to the bonding device of the fuel cell part according to one form of the present disclosure.

As shown in FIG. 10, the air damping unit 70 includes an air chamber 71, a damping plate 73, an air supply 75, and a displacement sensor 77.

The air chamber 71 is provided with an open upper end on the upper surface of the lower die 10. The damping plate 73 closes the upper end of the air chamber 71 and is installed to be able to flow in the up and down direction. The air supply 75 is connected with the air chamber 71 and can supply air of a predetermined pressure into the air chamber 71.

Here, the damping plate 73 may be provided so as to be able to close and seal the air chamber 71 and to flow in the up-and-down direction without being detached from the open end side of the air chamber 71. The air supply 75 may include air compressors or air blowers of known art.

The displacement sensor 77 is installed inside the air chamber 71. The displacement sensor 77 senses upward and downward displacement of the damping plate 73 and outputs a detection signal to a controller 90.

The displacement sensor 77 may include a linear encoder known in the art. The linear encoder is a reflection-type optoelectronic detector that detects the amount of displacement using lattice gradations of a glass scale, a light-emitting element, and a light-receiving device, and converts light intensity change into an electrical signal to output the amount of displacement. Alternatively, the above-described displacement sensor 77 may include a well-known electronically-induced encoder that detects the amount of displacement in an electronically induced manner.

Meanwhile, as a controller for controlling the overall operation of the device 100, the controller 90 can be implemented as at least one control processor operating by a predetermined program, and in order to perform the contents according to one form of the present disclosure, it may contain a series of instructions.

Here, the controller 90 applies an electrical control signal to the air supply 75 according to the detection signal of the displacement sensor 77, and can control the air pressure supplied to the air chamber 71.

Hereinafter, operation of the bonding device 100 of the fuel cell part, and a bonding method of the fuel cell part using the bonding device 100 according to one form of the present disclosure will be described in detail with reference to the above-described drawings and accompanying drawings.

FIG. 11 to FIG. 20 are provided for description of a bonding method of the fuel cell part according to one form of the present disclosure.

Figure 11:
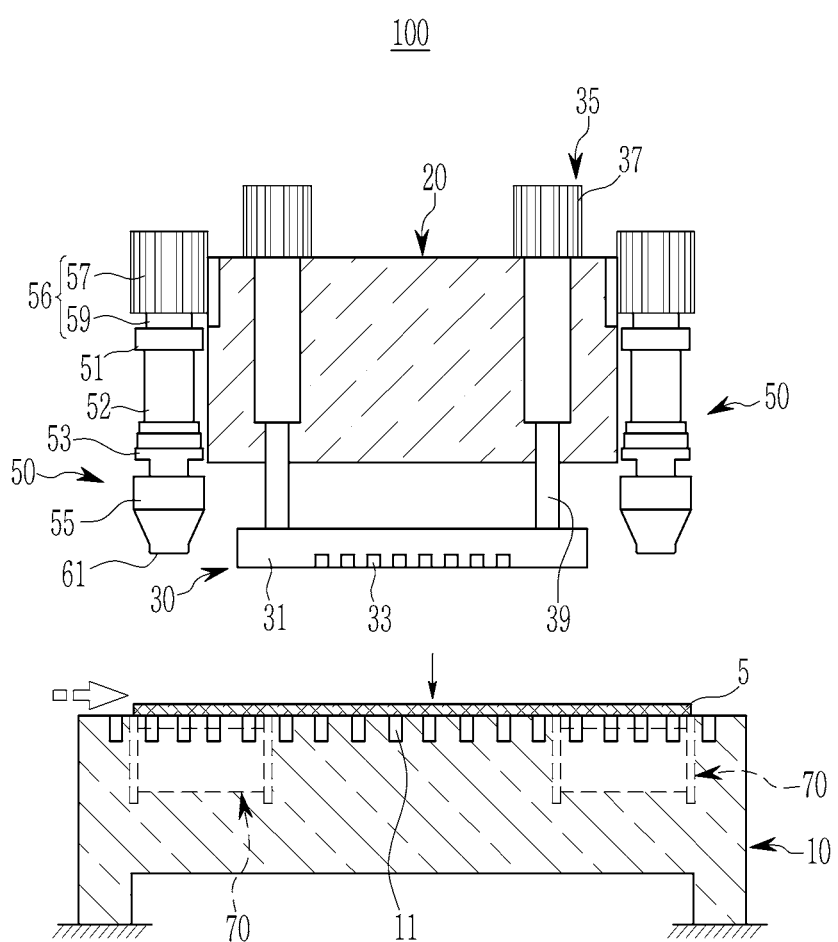
FIGS. 11, 12, 13, 14, 15, 16, 17, 18, 19, and 20 are provided to illustrate a bonding method of a fuel cell part according to one form of the present disclosure.

Referring to FIG. 11, the damping plate 73 of the air damping unit 70 at the lower die 10 forms the same plane as the top surface of the lower die 10 by air pressure supplied to the air chamber 71 through the air supply 75 at a predetermined pressure.

The vacuum adsorption member 30 in the upper die 20 is in a raised state by the backward movement of the first driving source 35 and the vacuum suction is blocked for the vacuum suction holes 33 of the vacuum adsorption member 30.

Further, at the upper die 20, the horn member 55 of the ultrasonic wave vibration source 50 is raised with the converter 52 and booster 53 through the moving member 51 in the backward motion of the second driving source 56.

In such a state, in one form of the present disclosure, the upper gas diffusion layer 5 is loaded on a predetermined region on the upper surface of the lower die 10, and the upper gas diffusion layer 5 is applied with an adhesive layer 9 in the form of single spots at opposite edge portions thereof.

Here, the loading of the upper gas diffusion layer 5 may be carried out by a robot gripper (not illustrated in the drawing). In one form of the present disclosure, the upper gas diffusion layer 5 is loaded on the GDL adsorption area 13 on the top side of the lower die 10.

Next, in one form of the present disclosure, the vacuum suction is applied to the vacuum suction holes 11 of the lower die 10 through a vacuum pump (not shown in the drawing). Then, the upper gas diffusion layer 5 is vacuum-sucked in the GDL adsorption area 13 by the vacuum suction acting on the vacuum suction holes 11 of the lower die 10, and is maintained in the correct position.

Figure 12:
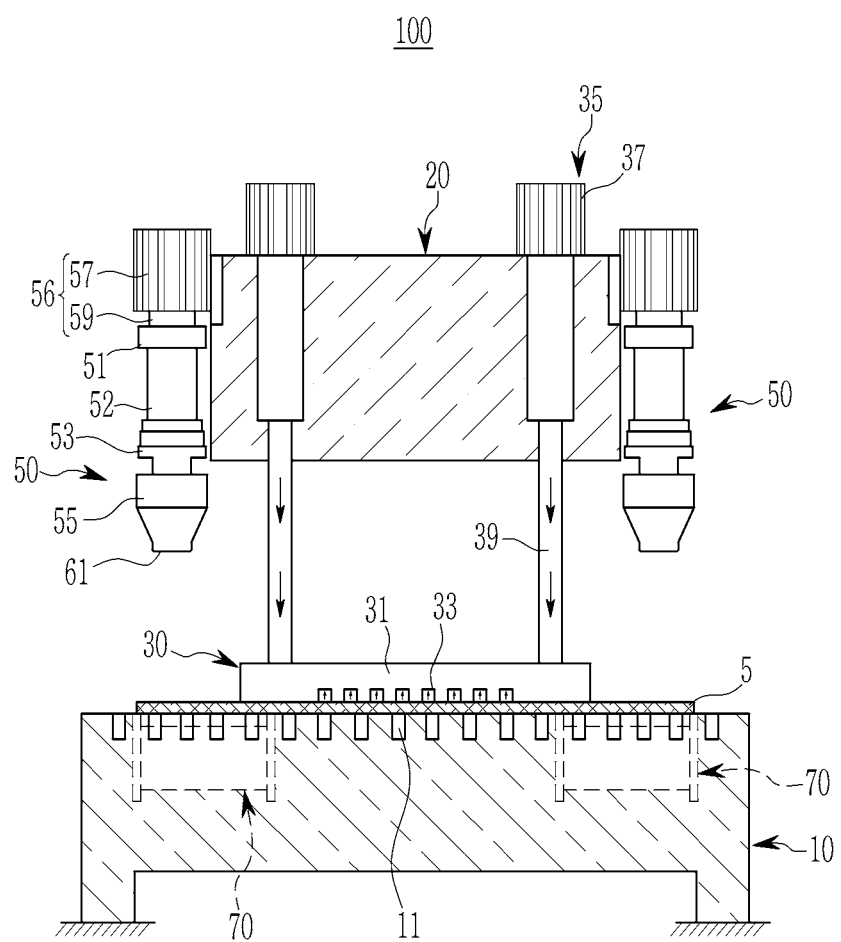

Next, in one form of the present disclosure, as shown in FIG. 12, the first driving source 35 lowers the vacuum adsorption member 30 and regulates the upper gas diffusion layer 5 on the lower die 10 through the vacuum adsorption member 30.

Then, in one form of the present disclosure, the vacuum suction acting on the vacuum suction holes 11 of the lower die 10 is blocked, and at the same time, a vacuum suction is applied to the vacuum suction holes 33 of the vacuum adsorption member 30 and the upper gas diffusion layer 5 is vacuum-sucked to the vacuum adsorption member 30 by the vacuum suction acting on the vacuum suction holes 33.

Figure 13:
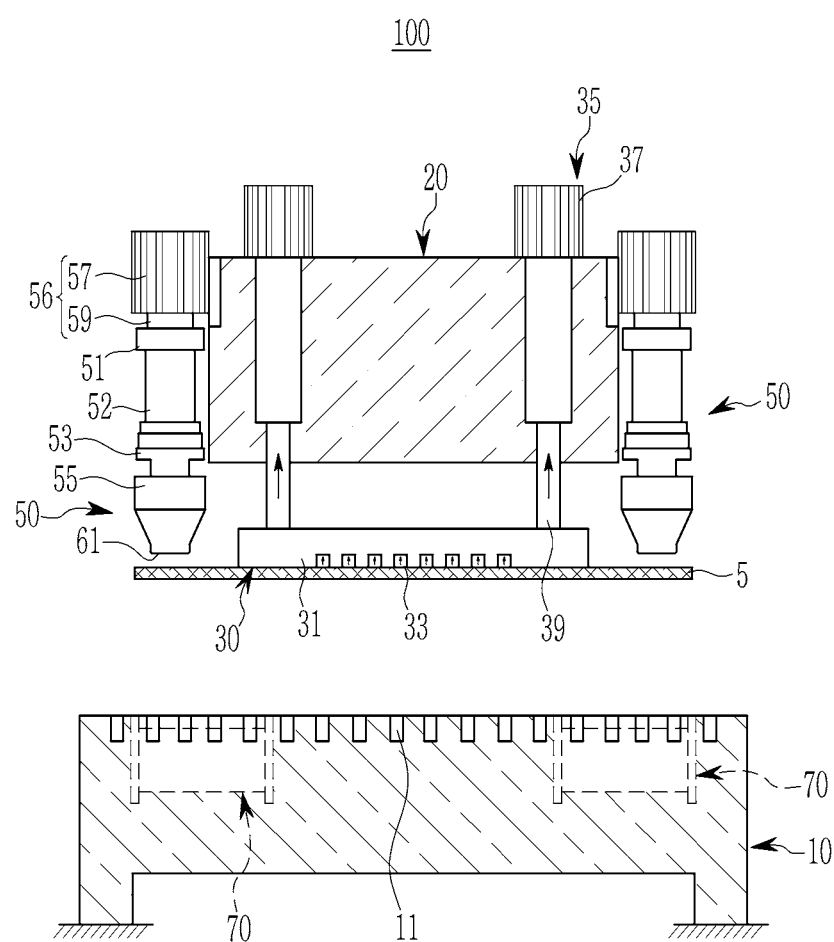

Next, in one form of the present disclosure, as shown in FIG. 13, the first driving source 35 causes the vacuum adsorption member 30 to rise. Then, the upper gas diffusion layer 5 is vacuum-sucked to the vacuum adsorption member 30, and moves in the upper direction.

Figure 14:
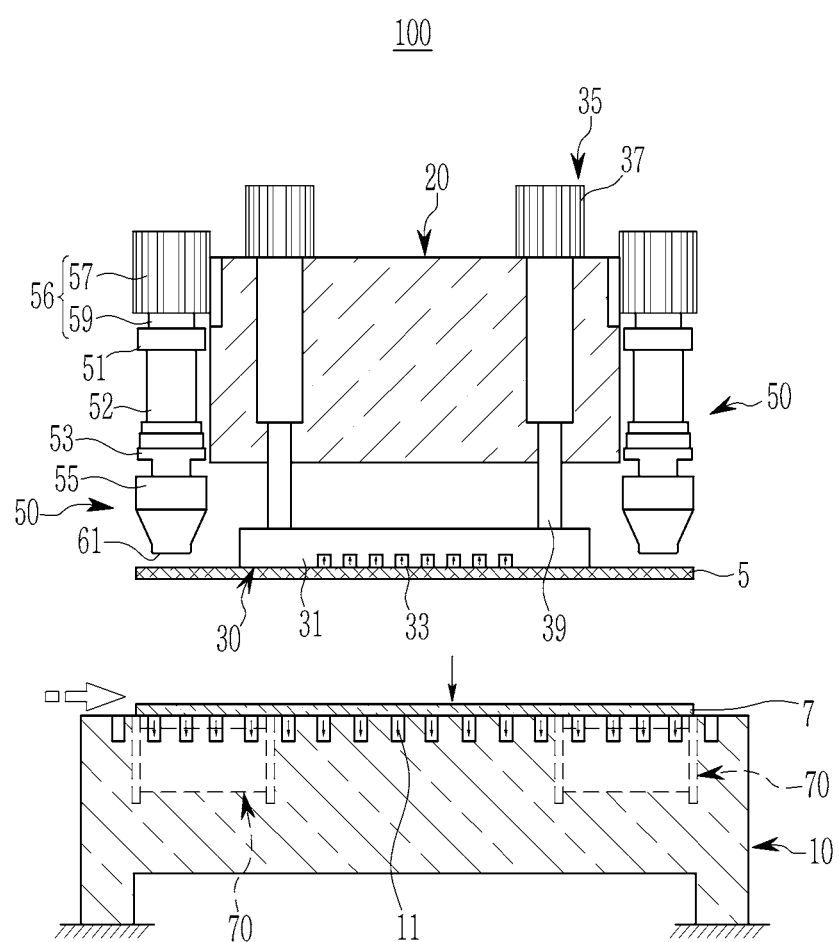

Next, in one form of the present disclosure, as shown in FIG. 14, the lower gas diffusion layer 7 is loaded on a predetermined region on the upper surface of the lower die 10, and the lower gas diffusion layer 7 is applied with an adhesive layer 9 in the form of single spots at opposite edge portions thereof.

Here, the loading of the lower gas diffusion layer 7 may be carried out by a robot gripper (not illustrated in the drawing). In one form of the present disclosure, the lower gas diffusion layer 7 is loaded on the GDL adsorption area 13 on the top side of the lower die 10.

Next, in one form of the present disclosure, the vacuum suction is applied to the vacuum suction holes 11 of the lower die 10 through a vacuum pump (not shown in the drawing). Then, the lower gas diffusion layer 7 is vacuum-sucked in the GDL adsorption region 13 by the vacuum suction acting on the vacuum suction holes 11 of the lower die 10, and is maintained in the correct position.

Figure 15:
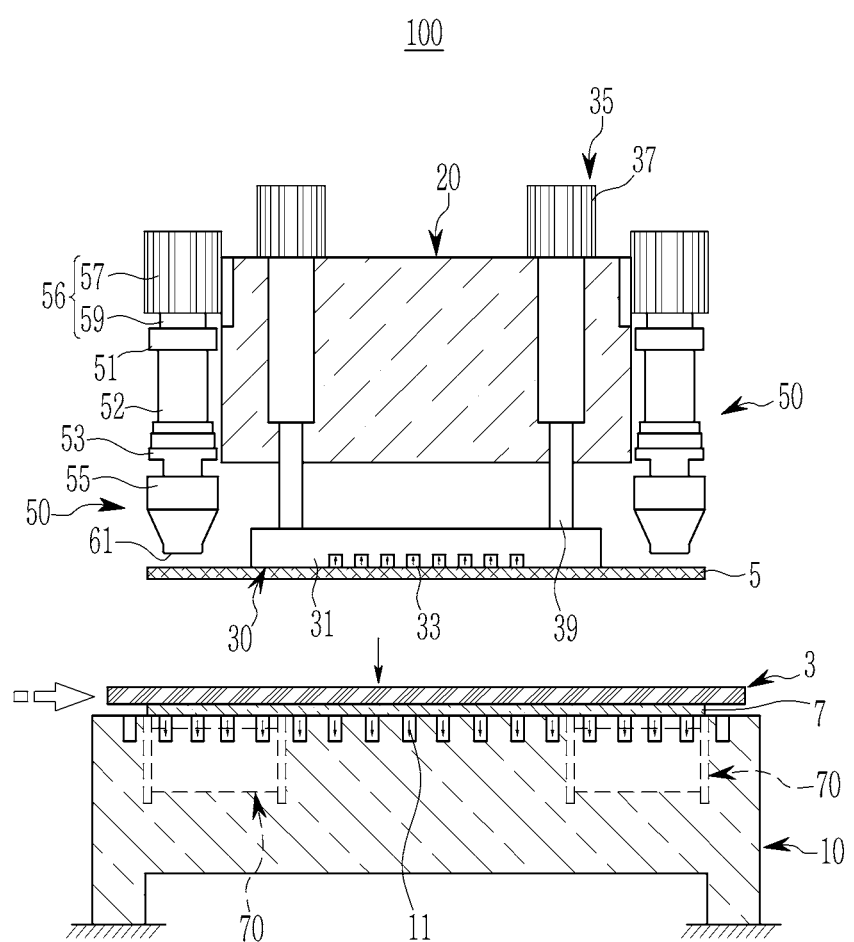

Then, as shown in FIG. 15, in one form of the present disclosure, the MEA base material 3 is loaded onto the lower gas diffusion layer 7 of the lower die 10 in a state that the vacuum adsorption member 30 moves upward while vacuum-adsorbing the upper gas diffusion layer 5. At this time, loading of the MEA base material 3 can be carried out by a robot gripper not shown in the drawing.

In this process, since the vacuum suction acts on the vacuum suction holes 11 of the lower die 10, the lower gas diffusion layer 7 is vacuum-sucked by the vacuum suction in the GDL adsorption area 13 and at the same time the edge side of the sub-gasket 4*d* of the MEA base material 3 is vacuum-sucked in the MEA adsorption area 15. Accordingly, the MEA base material 3 can be maintained at the right position on the lower gas diffusion layer 7.

Figure 16:
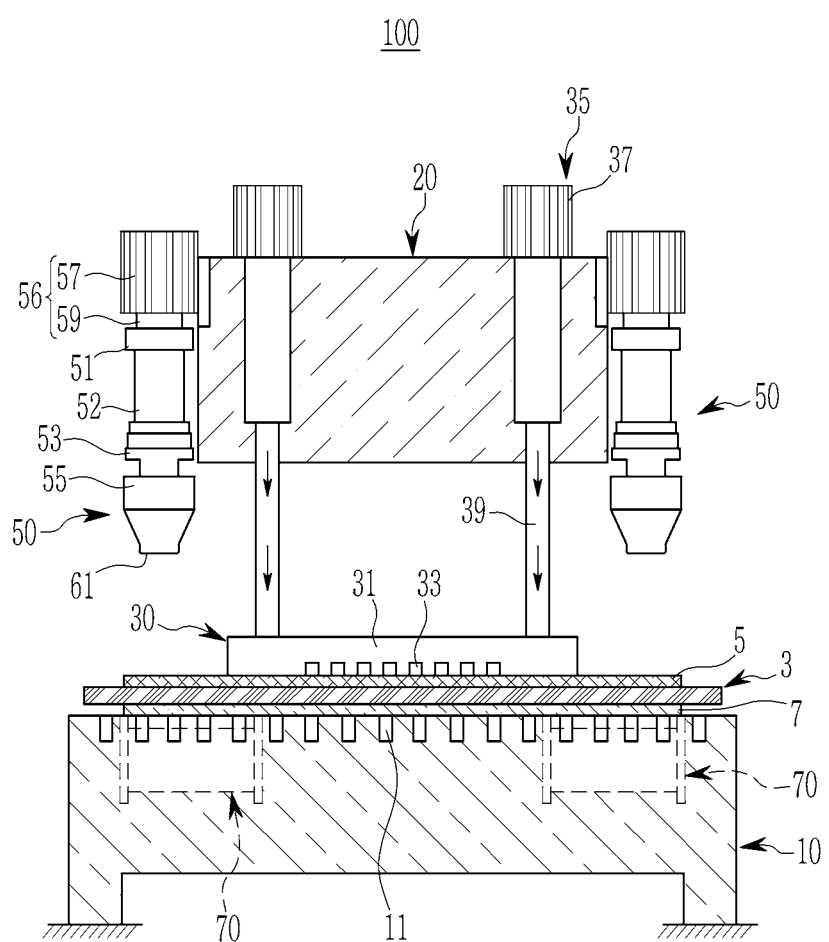

Next, as shown in FIG. 16, in one form of the present disclosure, the upper gas diffusion layer 5 vacuum-sucked on the vacuum adsorption member 30 is loaded on the MEA base material 3, while the vacuum adsorption member 30 is lowered by the forward operation of the driving source 35.

The loading of the upper gas diffusion layer 5 means that the upper gas diffusion layer 5 is placed on the MEA base material 3 by pressing the MEA base material 3 through the vacuum adsorption member 30.

In this case, the MEA base material 3 is located between the upper gas diffusion layer 5 and the lower gas diffusion layer 7, and the adhesive layers 9 of the upper gas diffusion layer 5 and the lower gas diffusion layer 7 are located at the edge portions of the top and bottom open ends of the sub-gaskets 4d of the MEA base material 3.

Figure 17:
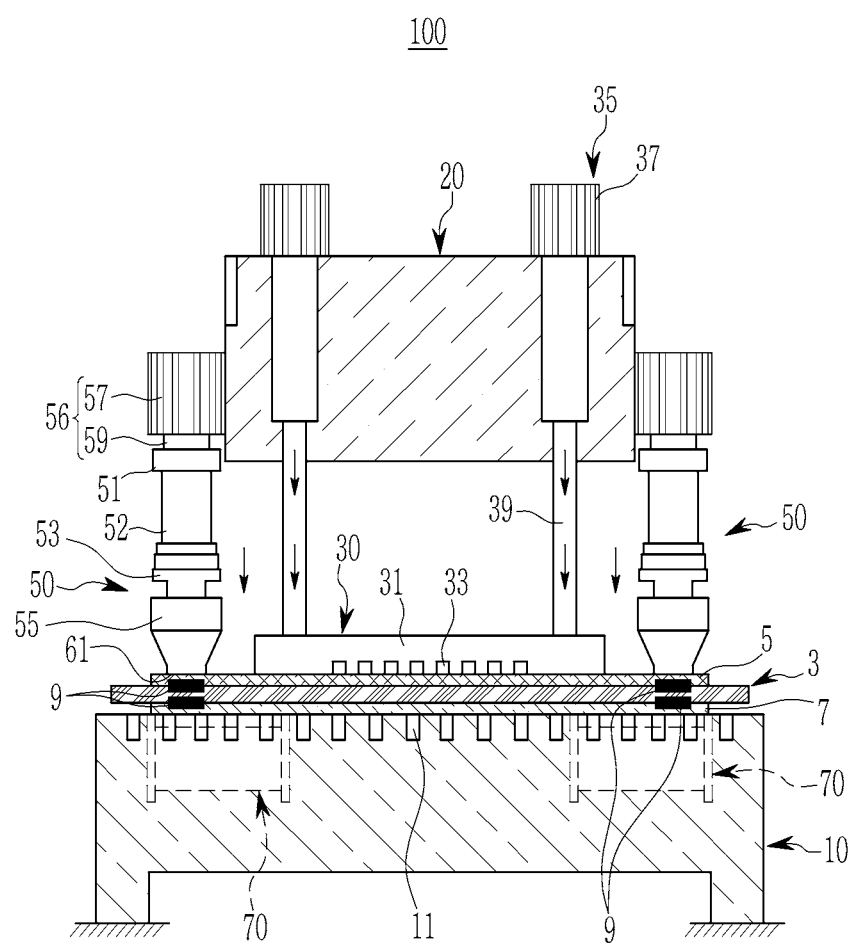

Next, as shown in FIG. 17, in one form of the present disclosure, while vacuum suction with respect to the vacuum suction holes 33 of the vacuum adsorption member 30 is blocked, the moving member 51 of the ultrasonic wave vibration source 50 is lowered by the forward movement of the second driving source 56 and the horn member 55 is moved in the lower direction together with the converter 52 and the booster 53 through the moving member 51.

Then, the horn member 55 compresses the local region of the upper gas diffusion layer 5 corresponding to the adhesive layer 9 to a predetermined pressure (for example, 250 to 450 N) through the compression end 61. At this time, the local region of the upper gas diffusion layer 5 is located on the damping plate 73 side of the above-mentioned air damping unit 70.

Figure 18:
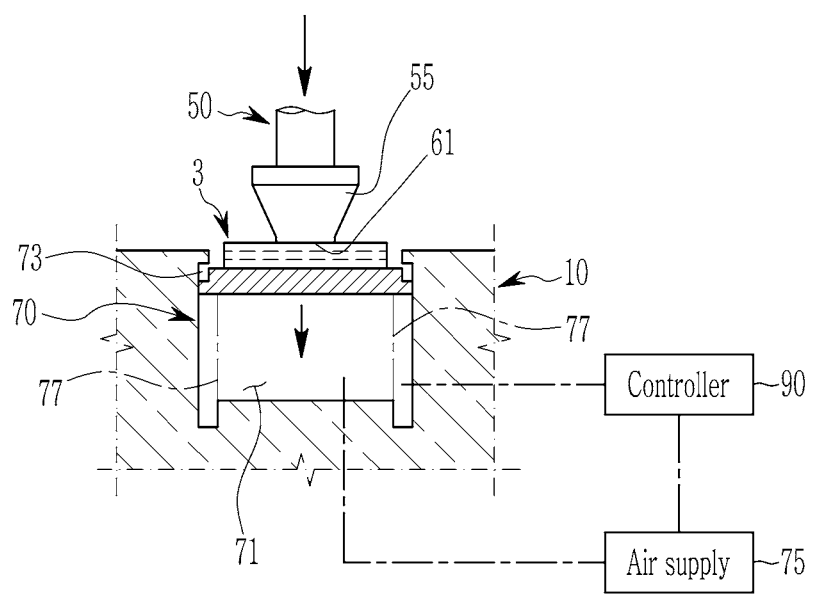

As shown in FIG. 18, the damping plate 73 is moved in the lower direction by overcoming the predetermined air pressure (air pressure of less than the pressure of the horn member) in the air chamber 71 by the pressure of the horn member 55, and dampens the compression force of the horn member 55.

In this case, the displacement sensor 77 detects the displacement of the damping plate 73 and outputs the detection signal to the controller 90. The controller 90 then applies an electrical signal to the air supply 75 at a time when the displacement of the damping plate 73 sensed by the displacement sensor 77 satisfies a predetermined reference value, and air pressure corresponding to the pressing force of the horn member 55 is supplied to the inside of the air chamber 71 through the air supply 75.

In this case, the predetermined reference value means a displacement value of the damping plate 73 corresponding to a value obtained by subtracting the thickness after the compression at the local region of the upper gas diffusion layer 5 and the lower gas diffusion layer 7 from the thickness before the compression at the local region.

For example, when the pre-compression thickness of the local region of the upper gas diffusion layer 5 and the lower gas diffusion layer 7 is 600 μm, the local region may be compressed to a thickness of about 500-540 μm by a compression force of the compression end 51 and a damping force of the compression region of the compression end 61.

In this case, in one form of the present disclosure, the corners of the compression end 61 are formed in a round shape and thus the damage of the material surface to the local region of the upper gas diffusion layer 5 can be reduced.

In such a state, in one form of the present disclosure, the vacuum suction for the vacuum suction holes 11 of the lower die 10 is blocked and an electrical signal is applied to the converter 52 of the ultrasonic wave vibration source 50.

Then, the electrical signal is converted into mechanical vibration energy through the converter 52, the mechanical vibration energy is amplified and attenuated by the booster 53, and a predetermined amplitude (for example, 20 KHz/ 20-30 μm) is applied to the compression end 61 of the horn member 55.

Figure 19:
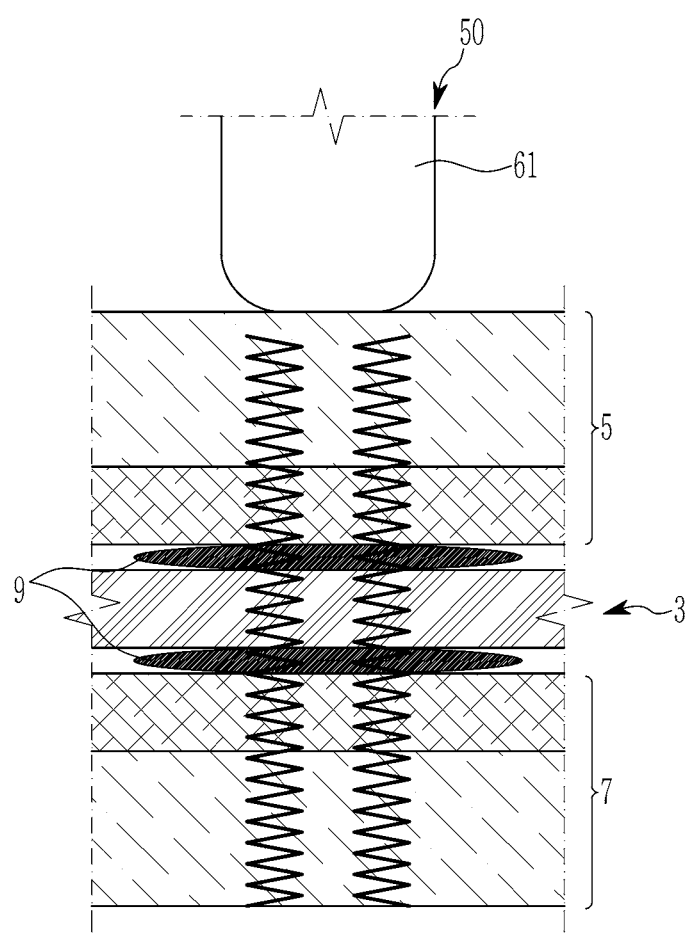

As shown in FIG. 19, the ultrasonic wave vibration energy is transmitted to the damping plate 73 through the compression end 61, and in one form of the present disclosure, the displacement of the damping plate 73, which moves up and down by the ultrasonic wave vibration energy, is detected and a detection signal is output to the controller 90.

Thus, the controller 90 applies an electrical signal to the air supply 75 according to the displacement of the damping plate 73, adjusts the pressure of the air acting on the air chamber 71 through the air supply 75, and provides a damping force as an air pressure to the dam plate 73.

Accordingly, in one form of the present disclosure, ultrasonic wave vibration energy can be transmitted to the local region of the upper gas diffusion layer 5, the adhesive layer 9 of the upper gas diffusion layer 5, the MEA base material 3, the adhesive layer 9 of the lower gas diffusion layer 7, and the local region of the lower gas diffusion layer 7 through the compression force of the compression end 61 and the damping force of the damping plate 73.

Thus, in one form of the present disclosure, the ultrasonic wave vibration energy is applied to the adhesive layer 9 to soften and melt the adhesive layer 9 by the internal heating from the ultrasonic wave vibration energy, and the edge portions of the upper layer gas diffusion layer 5 and the lower gas diffusion layer 7 can be bonded to the top and bottom open end edges of the sub-gaskets 4d through the adhesive layers 9.

Figure 20:
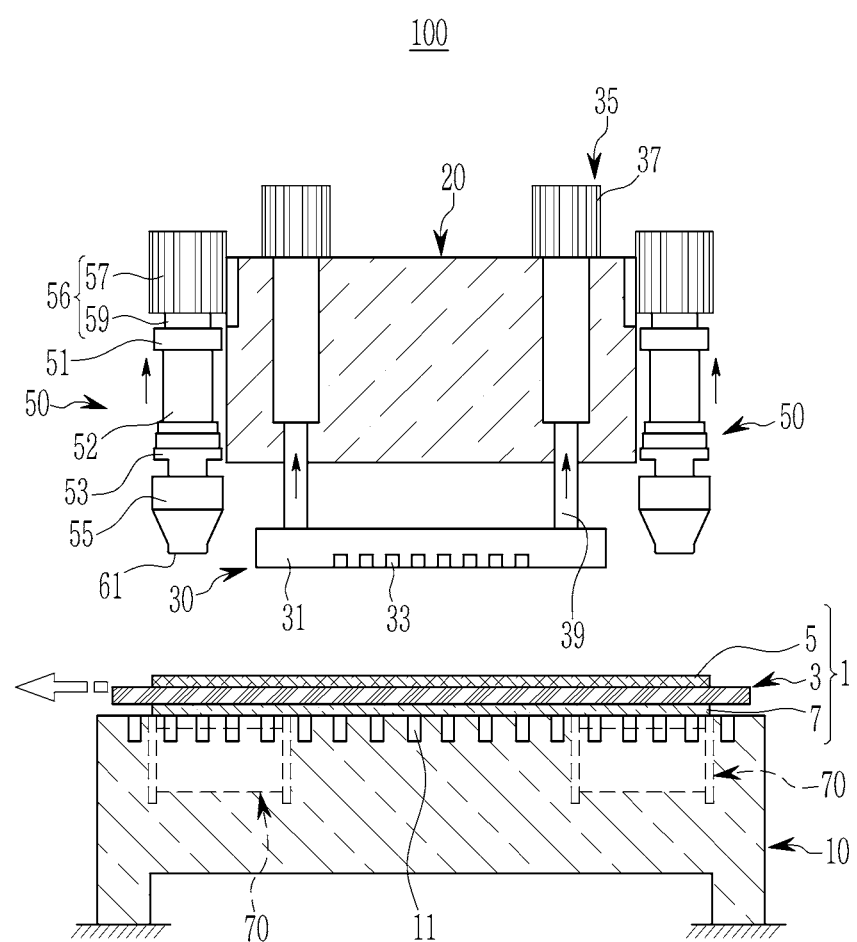

Finally, in one form of the present disclosure, as shown in FIG. 20, when the vacuum adsorption member 30 is raised by the backward operation of the first driving source 35 and the horn member 55 of the ultrasonic wave vibration source 50 is raised by the backward operation of the second driving source 56, the fuel cell part 1 in which the upper gas diffusion layer 5 and the lower gas diffusion layer 7 are bonded to the upper and lower surfaces of the MEA base material 3 can be manufactured.

Unlike the conventional hot press method, the bonding device 100 of the fuel cell part and the bonding method using the same according to the above-described exemplary form of the present disclosure can bond the gas diffusion layers 5 and 7 to the upper and lower surfaces of the MEA base material 3 in a manner of welding by softening and melting the adhesive layers 9 with heat applied thereto by ultrasonic wave vibration.

Therefore, in one form of the present disclosure, the ultrasonic wave vibration energy is applied to the adhesive layer 9 while compressing the local region of the gas diffusion layers 5 and 7 at a relatively low pressure (e.g., 60 kgf) compared to the hot press method, and thus the plastic deformation and damage of the outer material (carbonized paper) of the gas diffusion layers 5 and 7 can be reduced, and the bonding quality (durability etc.) of the gas diffusion layers 5 and 7 can be improved.

In addition, in one form of the present disclosure, since the compression force and the ultrasonic wave vibration energy of the ultrasonic wave vibration source 50 can be buffered through the air damping unit 70, the local regions of the upper gas diffusion layer 5 and the lower gas diffusion layer 7, which are brittle, can be inhibited from being damaged.

In one form of the present disclosure, the ultrasonic wave vibration source 50 compresses the local regions of the gas diffusion layers 5 and 7 and applies the ultrasonic wave vibration energy to the adhesive layers 9. Therefore, compared to the hot press method, productivity of the fuel cell part 1 can be further improved, for example, by shortening the bonding cycle time (for example, 5 seconds) between the MEA base material 3 and the gas diffusion layers 5 and 7.

In one form of the present disclosure, unlike the conventional hot-press method in which heat is directly applied to the adhesive layer through the gas diffusion layer and the MEA base material, a method in which heat is locally applied to the adhesive layer 9 through ultrasonic wave vibration energy is adopted, and thus it is possible to inhibit the electrolyte membrane of the MEA base material 3 from being thermally deformed.

Furthermore, in one form of the present disclosure, a method of welding the MEA material 3 and the gas diffusion layers 5 and 7 by ultrasonic wave vibration energy while applying adhesive layer 9 in a spot form to gas diffusion layers 5 and 7 is employed, and thus consumption of the adhesive and the cost of the adhesive can be reduced.

Hereinabove, although exemplary forms of the present disclosure are described, the spirit of the present disclosure is not limited to the forms set forth herein and those skilled in the art and understanding the present disclosure can easily accomplish other forms included in the spirit of the present disclosure by the addition, modification, and removal of components within the same spirit, but those are construed as being included in the spirit of the present disclosure.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirt and scope of the present disclosure.

The invention claimed is:

1. A method for bonding a fuel cell part comprising:
providing an MEA base material that forms electrode layers on opposite sides of an electrolyte membrane and covers edge portions of the electrolyte membrane and the electrode layers through sub-gaskets, and an upper gas diffusion layer and a lower gas diffusion layer, each applied with an adhesive layer as a spot at edge portions that face the sub-gaskets at opposite sides of the MEA base material;
bonding the upper gas diffusion layer and the lower gas diffusion layer to upper and lower surfaces of the MEA base material through the adhesive layer by using a bonding device;
(a) loading the upper gas diffusion layer on a predetermined area of a lower die, and vacuum-adsorbing the upper gas diffusion layer;
(b) lowering a vacuum adsorption member of an upper die, vacuum-adsorbing the upper gas diffusion layer through the vacuum adsorption member, and raising the vacuum adsorption member;
(c) loading the lower gas diffusion layer on a predetermined area of the lower die, vacuum-adsorbing the lower gas diffusion layer, and loading the MEA base material on the lower gas diffusion layer;
(d) lowering the vacuum adsorption member, and loading the upper gas diffusion layer on the MEA base material; and
(e) moving an ultrasonic wave vibration source in a downward direction, compressing local regions set at opposite sides of the upper gas diffusion layer through a horn member of the ultrasonic wave vibration source, and applying ultrasonic wave vibration energy to the adhesive layer through the horn member.

2. The bonding method of the fuel cell part of claim 1, wherein, in (e),
a compression force of the horn member is dampened through an air damping unit of the lower die, and a damping force is applied to the horn member through a damping plate as air compression that reacts with ultrasonic wave vibration energy; and
displacement of the damping plate that vertically moves in an air chamber of the air damping unit is sensed by a displacement sensor, and a detection signal is output to a controller.

3. The bonding method of the fuel cell part of claim 2, wherein, in (e), the controller controls pressure of air supplied to the air chamber according to the detection signal of the displacement sensor.

4. The bonding method of the fuel cell part of claim 1, wherein, in (a), vacuum suction is applied to vacuum suction holes of the lower die,
in (b), vacuum-adsorption pressure with respect to the vacuum suction holes of the lower die is blocked, and
in (c), vacuum-adsorption pressure is applied to the vacuum suction holes of the lower die, and the lower gas diffusion layer and the MEA base material are vacuum-sucked.

5. The bonding method of the fuel cell part of claim 1, wherein,
in (d), vacuum-adsorption pressure is applied to vacuum suction holes of the vacuum adsorption member, and
in (e), vacuum-adsorption pressure with respect to the vacuum suction holes of the vacuum adsorption member is blocked, and vacuum-suction with respect to the vacuum suction holes of the lower die is blocked.

* * * * *